United States Patent [19]

Pietratus et al.

[11] 4,233,259
[45] Nov. 11, 1980

[54] METHOD OF AND APPARATUS FOR PRODUCING PROFILED STRANDS FROM ELASTOMERIC MATERIAL

[75] Inventors: Udo Pietratus, Northeim; Fritz Röthemeyer, Isernhagen, both of Fed. Rep. of Germany

[73] Assignee: Continental Gummi-Werke Aktiengesellschaft, Hanover, Fed. Rep. of Germany

[21] Appl. No.: 951,638

[22] Filed: Oct. 16, 1978

[30] Foreign Application Priority Data

Oct. 14, 1977 [DE] Fed. Rep. of Germany ....... 2746201

[51] Int. Cl.³ .......................... D01D 5/20; B29D 7/00
[52] U.S. Cl. ................................. 264/167; 264/177 R; 264/177 F; 425/131.1; 425/465
[58] Field of Search ............... 264/167, 177 R, 177 F; 425/382.2, 464, 382, 131.1, 461, 465, 466; 428/369, 370

[56] References Cited

U.S. PATENT DOCUMENTS

| | | | |
|---|---|---|---|
| 1,685,249 | 9/1928 | Tanzi | 425/465 |
| 1,959,006 | 5/1934 | Penza | 425/465 |
| 2,049,754 | 8/1936 | Tanzi | 425/461 |
| 2,456,113 | 12/1948 | Dorner | 425/465 |
| 2,638,855 | 5/1953 | Maldavi | 425/464 |
| 3,019,483 | 2/1962 | Schultheiss | 264/167 |
| 3,111,715 | 11/1963 | Hofer | 264/167 |
| 3,233,286 | 2/1966 | Batosti et al. | 264/167 |
| 3,280,847 | 10/1966 | Chisholm et al. | 264/167 |
| 3,349,434 | 10/1967 | Hureau | 425/464 |
| 3,382,122 | 5/1968 | Nalle | 264/167 |
| 3,579,730 | 5/1971 | Ausnit | 425/382 |

FOREIGN PATENT DOCUMENTS

1081588 12/1954 France .
49-5903 2/1974 Japan ..................... 425/465

*Primary Examiner*—Jay H. Woo
*Attorney, Agent, or Firm*—Becker & Becker, Inc.

[57] ABSTRACT

A method of and extrusion press for producing profiled strands from elastomeric material, especially undulated edges, for conveyor belts, including a linear base and a ridge placed on the base. Portions of the strand change direction along its length. The extrusion press method is used, and different flow velocities are imparted to the elastomeric material at different portions of the cross section of the strand. The extrusion press is equipped with a nozzle plate having profile openings corresponding to the cross sectional shape of the desired profiled strand. On that side which faces the press equipment—including wormgear, piston, and rollers—the nozzle plate is equipped with approach surfaces, which lead to the profile openings at angles inclined to the direction of extrusion, and which have different lengths in different cross-sectional regions of the profile openings. On that side which faces away from the press equipment, the extrusion press is provided with guide elements which are spaced from one another, extend in the direction of extrusion, and define or limit the transverse movement of the exiting profiled strand.

13 Claims, 4 Drawing Figures

METHOD OF AND APPARATUS FOR PRODUCING PROFILED STRANDS FROM ELASTOMERIC MATERIAL

The present invention relates to a method of producing profiled strands from elastomeric material, with a portion of the cross section of the strand changing its direction over the length of the strand. More specifically, the present invention relates to a method of producing undulated edges, for conveyor belts, including a linear base and a ridge or side wall placed on and forming pockets with the base. The present invention also relates to an extrusion press for carrying out such a method.

In the business of conveying loose or bulk material, the constantly prevalent endeavor for as high a conveying capacity as possible of the conveying belts used, is taken into account by, in addition to other known measures, also placing upon the edges of the belt undulating or waved side walls, so-called undulated edges. The undulations or expansion folds are designed in the form of open pockets, which, with regard to the unhindered rotation of the conveyor belts about the drive and reversing rollers, cannot be done without, and make the economical manufacture of such undulated edges by continuous production methods more difficult to such an extent that, according to the general view, up to now only the use of molds, combined with the constraint of discontinuous operation, have been considered and used practically exclusively.

In contrast thereto, it is an object of the present invention to make the continuous forming methods, which are used for natural and synthetic rubber and for rubber-like elastic synthetic materials, accessible for undulated edges for conveyor belts and for other profiled strands having sectional portions deflected in a similar manner from the linear construction. As a result of the advantage expected from the simplified manufacturing procedure, it is a further object of the present invention to also obtain considerable savings in the overall manufacturing costs.

These and other objects and advantages of the present invention will appear more clearly from the following specification in connection with the accompanying drawings, in which.

Figure 1:
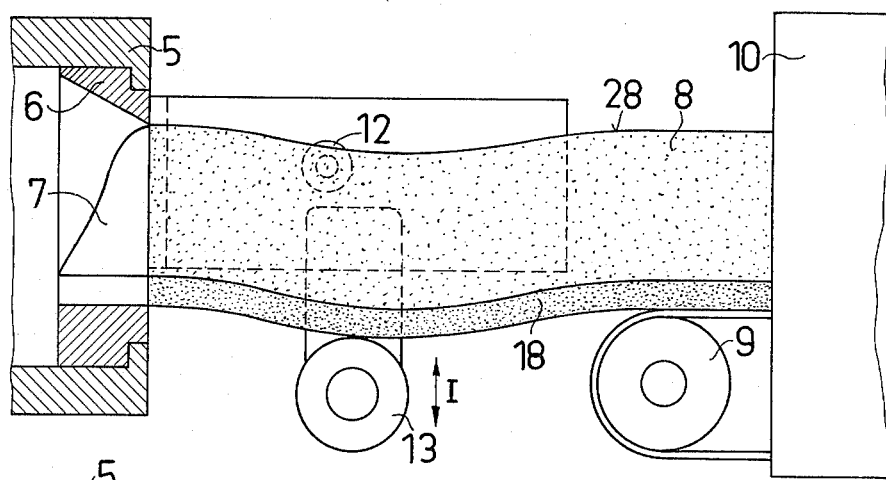
FIG. 1 is a side view of a partially sectioned head of an extrusion press with parts of devices which follow it.

The method of the present invention, starting with the method described above, is characterized primarily by the use of the extrusion press method, according to which different flow velocities are imparted to the elastomeric material in portions of the cross section of the strand. In particular, pursuant to an important feature of the present invention, those cross sectional portions of the profiled strands having the higher flow velocity are deflected at an angle to the direction of extrusion.

With the inventive introduction of a graduated pattern of distribution having different flow velocities across the cross section of the strand profile while the latter is being formed, that is, in the end phase of the shaping, applicant has succeeded against all current opinions, and therefore also unexpectedly, in utilizing extrusion which is otherwise unsuitable for this purpose but can be carried out economically and at relatively small apparatus expense, for producing partially undulated profiled strands which are designed with folds or the like. The transition to a continuous process, which helps in realizing an already longstanding desire in the practice, makes possible direct cost savings and simultaneously, without further expense, allows a considerable increase in the production capacity. Further cost reductions result indirectly from the cessation of all material waste and the requirement to rework form molds or remedy other surface irregularities caused by the method utilized.

An extrusion press which is suitable for carrying out the method of the present invention, and which is equipped with a nozzle plate having profile openings corresponding to the cross sectional shape of the profiled strands, is characterized primarily in that the nozzle plate is equipped on that side which faces the press equipment—worm-gear, piston, rollers, etc—with approach surfaces which lead to the profile openings at angles inclined to the direction of extrusion and which have different lengths in different cross sectional regions. On that side which faces away from the press equipment, the extrusion press is provided with guide elements which are spaced from one another, extend in the direction of extrusion, and define the transverse movement of the exiting profiled strand. In this connection, the approach surfaces are advantageously formed from recesses worked into the nozzle plate at different and/or differently varying inclined angles. The guide elements, which are placed in front of the nozzle plate on both sides of the profile openings expediently comprise two rigid bands, plates, sheets, or the like in selective parallel spaced relationship to one another, can have a length which encompasses at least two to four changes in direction of the transversely moving portion of the profiled strand.

The method of the present invention can be used with any type of extrusion press, since it exclusively influences the rheological operations directly in the entry region of the nozzle plate. The locally higher flow velocity results in an increased quantity supply to the affected sections of the profile openings. Since the thus enriched cross sectional portions cannot get ahead of the more slowly exiting portions of the profiled strands, the former attempt to turn aside by means of deflections. In this connection, on the rigid guide elements in front of the nozzle plate, the deflection movements on the one hand are limited and on the other hand are always again reversed with regard to the later direction of movement. If desired, the initial lateral direction can also be optionally generated or aided with the help of special limiting means, for example a nozzle which is connectable to a source of compressed air. In this manner, there result profiled strands having longer, yet gathered, folded sections than does a basic profile.

The finished formed profiled strand can be received directly by a withdrawal device and, insofar as vulcanizable rubber mixtures are concerned, can be supplied to a pass-through vulcanizing apparatus.

The function of the in itself known withdrawal device offers the opportunity to regulate and control the forming of the still plastic profiled strand. Since the wave length of the generated folds is determined to a large extent by the adjustment of the withdrawal speed to the exit speed of the profiled strand, the withdrawal drive is expediently controllable as a function of the changes in direction of the transversely movable strand portions, which directional changes follow one another in the region of the guide elements. For this purpose, pursuant to a further feature of the present invention, feeler elements, which affect the drive of the withdrawal device and which register approaches or contacts of the transversely movable portions of the profiled strand in mechanical, pneumatic, photoelectric, or other ways, can be provided in the region of the guide elements.

For forming special profiled strands having a fold band placed vertically on a solid base, for example conveyor belt undulated edges, it is advantageous to guide the profiled strand between the nozzle plate and the withdrawal device upon a curved path which, in the manner of an arch, drops below the level of the profiled openings in the nozzle plate. For this purpose, there is provided a freely turning guide roller which supports the profiled strand in the region of the guide elements, and is adjustable in the direction perpendicular to the direction of flow.

Figure 2:
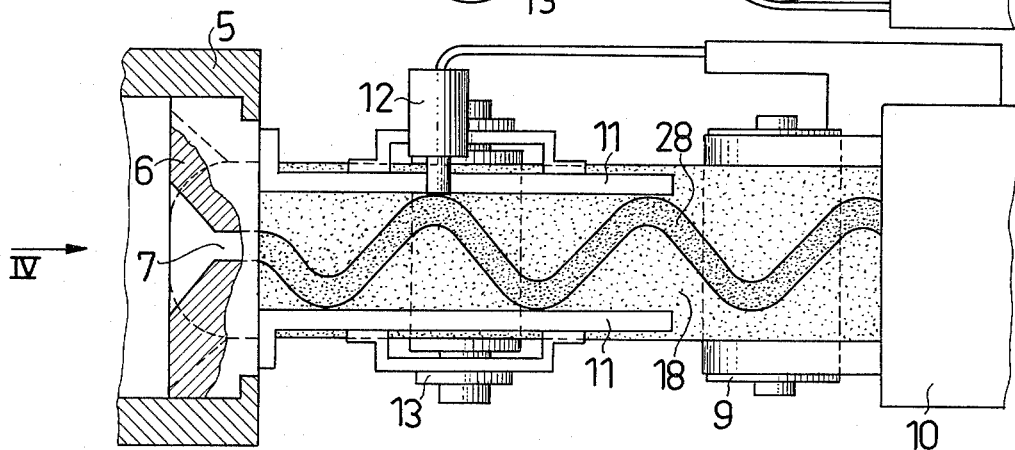
FIG. 2 is a top view of the arrangement shown in FIG. 1.

Referring now to the drawing in detail, part of an extrusion press is shown. The extrusion press, which in general is of a known construction, has a nozzle plate 6, with profile openings 7, as an end member of the extrusion head 5. A profiled strand 8 formed of vulcanizable rubber continuously leaves the profile openings 7 and, by means of a withdrawal device 9, is supplied to a vulcanization unit 10. The profiled strand 8 has the cross sectional shape of an inverted T with a band-like linear base 18 and a connected ridge 28 which is placed on the base 18 and extends in undulations (as seen clearly in FIG. 2). The profiled strand 8 is intended as an undulated edge for conveyor belts, with the wide contact or seating surface of the base 18 serving for the bonded mounting on the belt surface.

Figure 3:
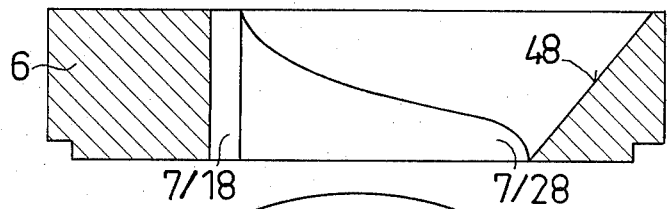
FIG. 3 is an enlargement in section of the nozzle plate of the extrusion press of FIG. 1.
Figure 4:
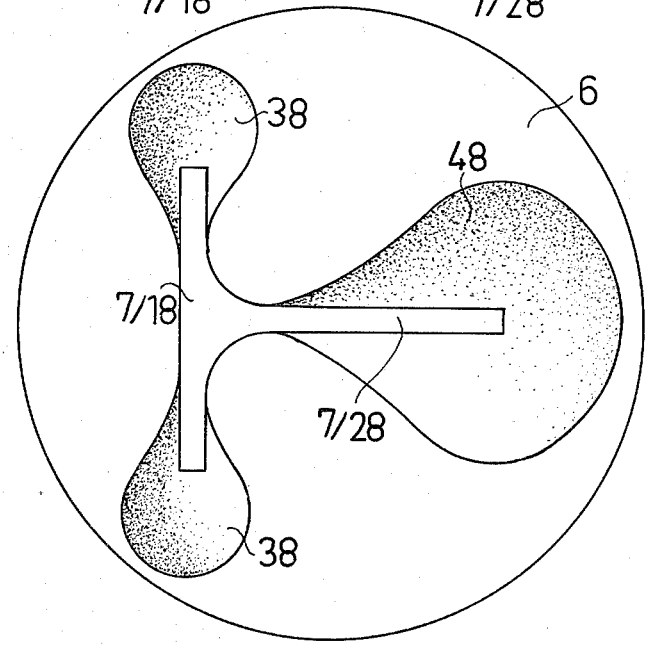
FIG. 4 is an enlargement of an end view taken in the direction of the arrow IV of FIG. 2.

To produce the wave structure in the ridge 28, the shape of the nozzle plate 6, which affects the flow of the plastic rubber mixture to the profile openings 7, is of great significance. As shown in detail in FIGS. 3 and 4, the profile openings 7 are enlarged in a funnel shape by milled out sections located on the rear inner side of the nozzle plate, which faces the press equipment of the extrusion press, at different angles in those regions which face the base 18 as well as the ridge 28, resulting in approach surfaces 38,48 of different length. The different slopes and approach lengths in turn have different flow velocities in the regions 18 and 28 of the profile openings 7, in which connection the higher flow velocity also requires greater quantity flow-through. In other words, increasingly more rubber mixture is conveyed through the vertical slit 28 in the nozzle plate 6 toward the top than through the horizontal slit which forms the base 18. As a result, the, as it were, "oversupplied" ridge 28, after leaving the nozzle plate, seeks to deflect laterally under the effect of the bulging stress which then sets in.

On the other side of the nozzle plate 6, on both sides of the profile openings 7, are two guide plates 11 which are adjustable in spaced relationship to one another and extend in the direction of extrusion. The guide plates 11 form a sort of open channel and limit the deflection movements of the ridge 28 to both sides. As soon as the ridge 28 contacts one of the guide plates 11, its direction is changed by this plate 11 and directed toward the other guide plate 11, so that, with the advancement of the linear longitudinal travel in the direction of extrusion, the regular wave pattern shown in FIG. 2 results.

For the uniformity of the undulations achieved, an accurate coordination of the conveying speed of the withdrawal device 9 to the extrusion speed is indispensible. Therefore, a feeler element 12 is provided for gauging the successive undulations and for feeding the counting pulses through a control system into the circuit of the drive motor for the withdrawal device 9. In the embodiment shown, the feeler element 12 is a pneumatic pressure tube connected to one of the guide plates 11. The feeler element 12 responds to the passing wave configurations through changes in pressure.

The chiefly uncontrolled profiled strand 8 which leaves the profile openings 7 of the nozzle plate 6 is supported between the guide plates 11 upon a freely turning follower roller 13 before it goes onto the withdrawal device 9. The roller 13 is adjustable in the vertical direction as indicated by the double arrow I and is normally located in the position shown in FIG. 1 below the level of the profile openings 7 or the withdrawal device 9. The plastic, still easily deformable profiled strand 8 thus passes through a downwardly curved path, which has proven to be advantageous for the formation of the undulations in the ridge 28.

The construction of the withdrawal device 8, as well as the nature of the vulcanizing apparatus 10, form no part of the present invention and can be arbitrarily selected pursuant to existing circumstances and conditions.

The particular difficulties solved by the present invention are in no way limited to conveyor belt undulated edges. Rather, the present invention is usable within a broad framework within the rubber and synthetic material processing industry merely under the premise of comparable starting conditions.

The present invention is, of course, in no way restricted to the disclosure of the drawing, but also encompasses any modifications within the scope of the appended claims.

What we claim is:

1. A method of continuously producing a profiled strand from elastomeric material, especially an undulated edge, for a wavy-edge conveyor belt, comprising a linear base and a ridge placed on the base, which includes in combination therewith the step of:

extruding elastomeric material in the form of the desired profiled strand while concurrently imparting different flow velocities to said elastomeric material at different portions of the cross section of said strand so that at least one portion of said strand changes direction in tapering pockets along its length.

2. A method in combination according to claim 1, in which said extruding includes at least one portion of said strand having an undulated pattern.

3. A method in combination according to claim 2, which includes the step of deflecting those portions of said strand, to which the higher flow velocities are imparted, at an angle to the direction of extrusion.

4. An extrusion press for endlessly producing a profiled wavy-edge conveyor belt strand from elastomeric material, which comprises in combination:

an extruder head;
   a nozzle plate forming a part of said extruder head and having profile openings which correspond in cross section to the cross sectional shape of said profiled strand, said nozzle plate having approach surfaces on that side facing counter to the direction of extrusion for guiding said elastomeric material to said profile openings, said approach surfaces ending at said profile openings being inclined to the direction of extrusion, and having different lengths at different portions of the cross section of said profile openings; and guide elements attached to said nozzle plate on that side of the latter facing the direction of extrusion, said guide elements being spaced from one another and extending in the direction of extrusion for limiting movement of a profiled strand leaving said profile openings.

5. An extrusion press in combination according to claim 4, in which said approach surfaces are formed by recesses located in said nozzle plate at different angles.

6. An extrusion press in combination according to claim 4, in which said guide elements are placed on both sides of said profile openings, are selectively spaceable from each other, and comprise two rigid members.

7. An extrusion press in combination according to claim 4, in which the length of said guide elements encompasses at least two to four changes in direction of the transversely moving portion of a profiled strand.

8. An extrusion press in combination according to claim 4, which includes a withdrawal device which is adapted to receive a profiled strand, is located at the level of said profile openings, and is spaced from said nozzle plate such that a profiled strand extending from said nozzle plate to said withdrawal device drops below the level of said profile openings in the manner of an arch while following a curved path.

9. An extrusion press in combination according to claim 8, which includes a freely turning guide roller for supporting a profiled strand in the region of said guide elements, said guide roller being adjustable in the direction perpendicular to the direction of extrusion.

10. An extrusion press in combination according to claim 8, in which said withdrawal device is controllably driven as a function of the changes in direction of the transversely moving portion of a profiled strand in the region of said guide elements.

11. An extrusion press in combination according to claim 10, which includes feeler means in the region of said guide elements for affecting the driving of said withdrawal device by registering the approach and contact of the transversely moving portion of a profiled strand.

12. An extrusion press in combination according to claim 4, which includes means located at least close to said nozzle plate for deflecting the transversely movable portion of a profiled strand leaving said profile openings toward one of said guide members.

13. An extrusion press in combination according to claim 12, in which said deflecting means comprises a nozzle connectable to a source of compressed air.

* * * * *